United States Patent
Lee et al.

(10) Patent No.: US 9,871,566 B2
(45) Date of Patent: Jan. 16, 2018

(54) GROUPING BASED REFERENCE SIGNAL TRANSMISSION FOR MASSIVE MIMO SCHEME

(71) Applicant: LG ELECTRONICS INC., Seoul (KR)

(72) Inventors: Kilbom Lee, Seoul (KR); Jiwon Kang, Seoul (KR); Hyunsoo Ko, Seoul (KR); Jaehoon Chung, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 48 days.

(21) Appl. No.: 14/905,250

(22) PCT Filed: Feb. 21, 2014

(86) PCT No.: PCT/KR2014/001421
§ 371 (c)(1),
(2) Date: Jan. 14, 2016

(87) PCT Pub. No.: WO2015/008914
PCT Pub. Date: Jan. 22, 2015

(65) Prior Publication Data
US 2016/0156395 A1    Jun. 2, 2016

Related U.S. Application Data

(60) Provisional application No. 61/847,536, filed on Jul. 17, 2013.

(51) Int. Cl.
*H04B 7/0452* (2017.01)
*H04B 7/04* (2017.01)
(Continued)

(52) U.S. Cl.
CPC ......... *H04B 7/0452* (2013.01); *H04B 7/0421* (2013.01); *H04L 5/0048* (2013.01); *H04B 7/0413* (2013.01); *H04L 5/0016* (2013.01)

(58) Field of Classification Search
CPC .. H04B 7/0421; H04B 7/0452; H04B 7/0413; H04L 5/0016; H04L 5/0048
See application file for complete search history.

(56) References Cited

U.S. PATENT DOCUMENTS

2003/0095499 A1* 5/2003 Kim ..................... H04J 13/0048
370/209
2008/0084944 A1* 4/2008 Park ..................... H04B 7/0413
375/267

(Continued)

FOREIGN PATENT DOCUMENTS

EP    2254271 A1 * 11/2010    .............. H04J 13/18
EP    2346190 A2    7/2011
(Continued)

OTHER PUBLICATIONS

Sharp, "Details of Dynamic Aperiodic SRS configuration," 3GPP TSG RAN WG1 Meeting #62bis, R1-105270, Xi'an, China, Oct. 11-15, 2010, pp. 1-5.

*Primary Examiner* — Jenee Holland
(74) *Attorney, Agent, or Firm* — Birch, Stewart, Kolasch & Birch, LLP

(57) ABSTRACT

Grouping based reference signal transmission scheme for massive MIMO is disclosed. UEs are grouped and each UE group receives information on a sequence used for the uplink reference signal from a base station. The information is determined to assign orthogonal sequences to UEs within a UE group considering at least one or more of a number of orthogonal sequences, a number of the UEs within the UE group, amount of information to be transmitted, channel condition between the base station and each UE, and a number of sequences assigned to each UE of the UEs.

13 Claims, 10 Drawing Sheets

(51) Int. Cl.
H04L 5/00 (2006.01)
H04B 7/0413 (2017.01)

(56) References Cited

U.S. PATENT DOCUMENTS

| | | | | |
|---|---|---|---|---|
| 2008/0287155 A1* | 11/2008 | Xu | ............... | H04L 5/0007 455/522 |
| 2008/0318608 A1* | 12/2008 | Inoue | ............... | H04B 1/707 455/509 |
| 2009/0046645 A1* | 2/2009 | Bertrand | ............... | H04J 11/0069 370/329 |
| 2009/0129259 A1* | 5/2009 | Malladi | ............... | H04B 7/0417 370/210 |
| 2010/0002801 A1* | 1/2010 | Jia | ............... | H04B 7/0417 375/296 |
| 2010/0034076 A1* | 2/2010 | Kishiyama | ............... | H04J 11/005 370/210 |
| 2010/0067500 A1* | 3/2010 | Kim | ............... | H04B 7/0604 370/336 |
| 2010/0074343 A1* | 3/2010 | Gaal | ............... | H04L 27/261 375/259 |
| 2011/0170629 A1* | 7/2011 | Lee | ............... | H04L 5/005 375/295 |
| 2011/0206089 A1 | 8/2011 | Cho et al. | | |
| 2011/0237267 A1* | 9/2011 | Chen | ............... | H04J 11/003 455/450 |
| 2011/0243262 A1 | 10/2011 | Ratasuk et al. | | |
| 2011/0267972 A1 | 11/2011 | Yoon et al. | | |
| 2011/0269489 A1* | 11/2011 | Khoshnevis | ............... | H04L 25/0202 455/507 |
| 2012/0170479 A1* | 7/2012 | Ren | ............... | H04L 5/0055 370/252 |
| 2013/0070706 A1* | 3/2013 | Cho | ............... | H04L 1/1607 370/329 |
| 2013/0121266 A1 | 5/2013 | Ko et al. | | |
| 2014/0023255 A1* | 1/2014 | Lim | ............... | G06T 11/005 382/131 |
| 2014/0152493 A1* | 6/2014 | Scherzinger | ............... | G01C 21/165 342/357.3 |

FOREIGN PATENT DOCUMENTS

EP 2530896 A2 12/2012
WO WO 2014/208859 A1 12/2014

* cited by examiner

E-UMTS

FIG. 3
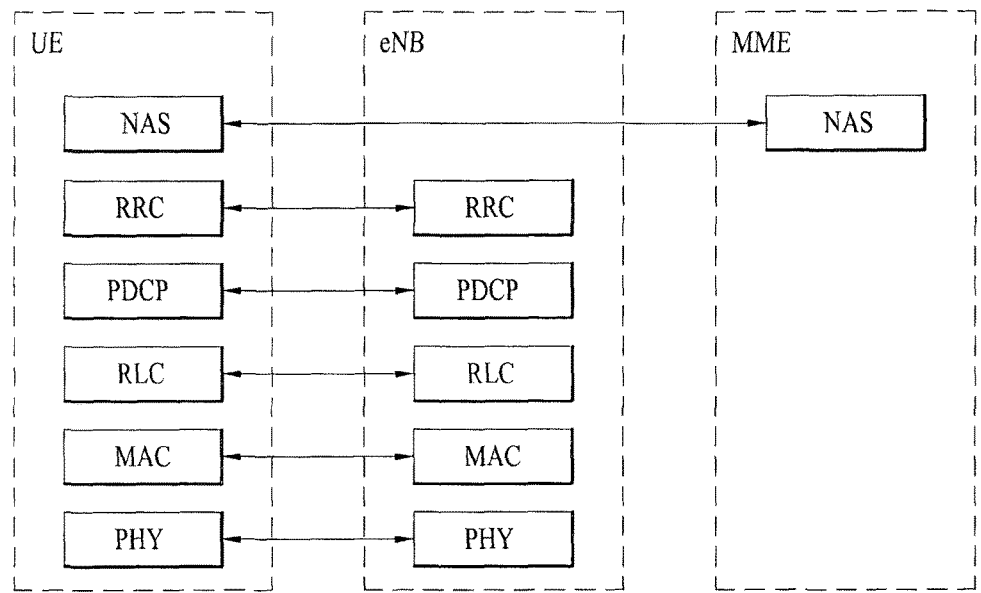
(a) contol - plane protocol stack
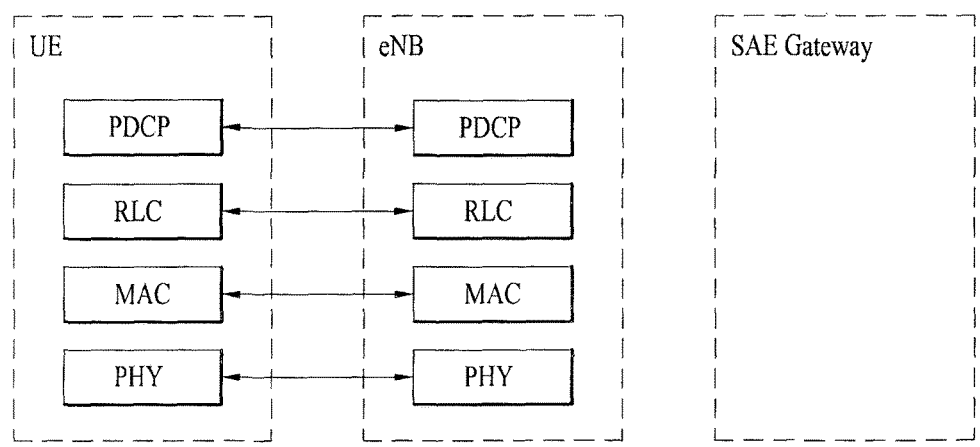
(b) user - plane protocol stack FIG. 6
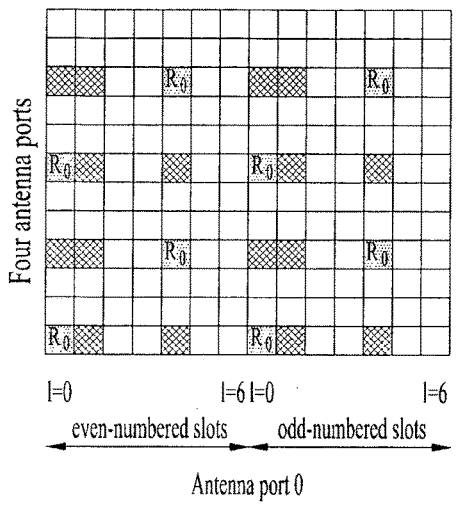
Antenna port 0
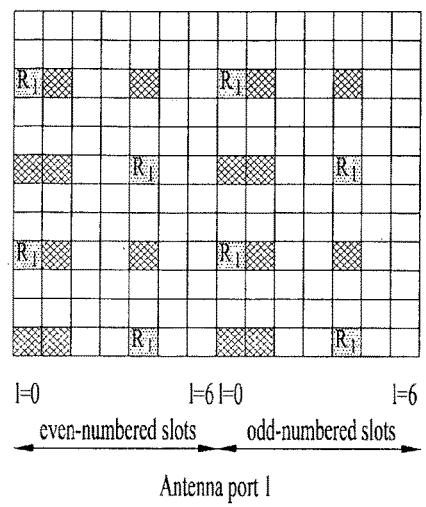
Antenna port 1
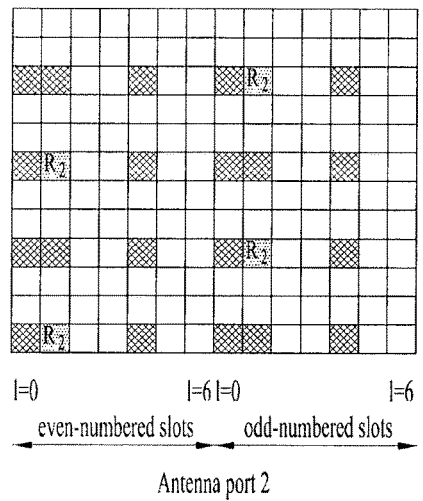
Antenna port 2
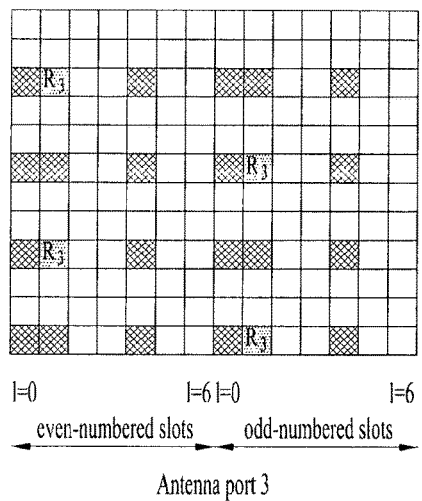
Antenna port 3

GROUPING BASED REFERENCE SIGNAL TRANSMISSION FOR MASSIVE MIMO SCHEME

CROSS REFERENCE TO RELATED APPLICATIONS

This application is the National Phase of PCT/KR2014/001421 filed on Feb. 21, 2014, which claims priority under 35 U.S.C. 119(e) to U.S. Provisional Application No. 61/847,536 filed on Jul. 17, 2013, all of which are hereby expressly incorporated by reference into the present application.

TECHNICAL FIELD

The present invention relates to a wireless communication system, and more particularly, to methods for grouping-based reference signal transmission for massive MIMO scheme, and apparatuses for the same.

BACKGROUND ART

As an example of a wireless communication system to which the present invention is applicable, a 3rd generation partnership project (3GPP) long term evolution (LTE) communication system will be schematically described.

FIG. 1 is a schematic diagram showing a network structure of an evolved universal mobile telecommunications system (E-UMTS) as an example of a wireless communication system. The E-UMTS is an evolved form of the legacy UMTS and has been standardized in the 3GPP. In general, the E-UMTS is also called an LTE system. For details of the technical specification of the UMTS and the E-UMTS, refer to Release 7 and Release 8 of "3rd Generation Partnership Project; Technical Specification Group Radio Access Network".

Referring to FIG. 1, the E-UMTS includes a user equipment (UE), an evolved node B (eNode B or eNB), and an access gateway (AG) which is located at an end of an evolved UMTS terrestrial radio access network (E-UTRAN) and connected to an external network. The eNB may simultaneously transmit multiple data streams for a broadcast service, a multicast service and/or a unicast service.

One or more cells may exist per eNB. The cell is set to operate in one of bandwidths such as 1.25, 2.5, 5, 10, 15, and 20 MHz and provides a downlink (DL) or uplink (UL) transmission service to a plurality of UEs in the bandwidth. Different cells may be set to provide different bandwidths. The eNB controls data transmission or reception to and from a plurality of UEs. The eNB transmits DL scheduling information of DL data to a corresponding UE so as to inform the UE of a time/frequency domain in which the DL data is supposed to be transmitted, coding, a data size, and hybrid automatic repeat and request (HARQ)-related information. In addition, the eNB transmits UL scheduling information of UL data to a corresponding UE so as to inform the UE of a time/frequency domain which may be used by the UE, coding, a data size, and HARQ-related information. An interface for transmitting user traffic or control traffic may be used between eNBs. A core network (CN) may include the AG and a network node or the like for user registration of UEs. The AG manages the mobility of a UE on a tracking area (TA) basis. One TA includes a plurality of cells.

Although wireless communication technology has been developed to LTE based on wideband code division multiple access (WCDMA), the demands and expectations of users and service providers are on the rise. In addition, considering other radio access technologies under development, new technological evolution is required to secure high competitiveness in the future. Decrease in cost per bit, increase in service availability, flexible use of frequency bands, a simplified structure, an open interface, appropriate power consumption of UEs, and the like are required.

DISCLOSURE

Technical Problem

Accordingly, the present invention is directed to methods for grouping-based reference signal transmission for massive MIMO scheme, and apparatuses for the same that substantially obviates one or more problems due to limitations and disadvantages of the related art.

Additional advantages, objects, and features of the invention will be set forth in part in the description which follows and in part will become apparent to those having ordinary skill in the art upon examination of the following or may be learned from practice of the invention. The objectives and other advantages of the invention may be realized and attained by the structure particularly pointed out in the written description and claims hereof as well as the appended drawings.

Technical Solution

To achieve these objects and other advantages and in accordance with the purpose of the invention, as embodied and broadly described herein, a method for a user equipment (UE) to operate in a wireless communication system employing a massive MIMO (Multiple Input Multiple Output) scheme, the method comprising: receiving information on a sequence to be used for an uplink reference signal from a base station, wherein the information is determined to assign orthogonal sequences to UEs within a UE group considering at least one or more of a number of orthogonal sequences, a number of the UEs within the UE group, amount of information to be transmitted, channel condition between the base station and each UE, and a number of sequences assigned to each UE of the UEs; and transmitting the uplink reference signal to the base station using the sequence identified by the second information, is proposed.

The number of sequences assigned to each UE may be determined based on a number of singular values greater than a threshold value, wherein the singular values are of a covariance matrix of a channel between the base station and each UE.

The above method may further comprises: transmitting a request message requesting an allocation of the sequence to be used for the uplink reference signal to the base station after a predetermined amount of time, if the number of sequences assigned to the UE is less than 1. Or, the number of sequences assigned to each UE may be equal to or greater than 1.

The number of sequences assigned to each UE may be controlled by adjusting the threshold value. The threshold value may be independently determined by each UE. Or, the threshold value may be determined by considering a specific condition of each UE and a common condition of the UEs of a same cell.

In another aspect of the present invention, a method for a base station to operate in a wireless communication system employing a massive MIMO (Multiple Input Multiple Output) scheme, the method comprising: transmitting information on a sequence used for an uplink reference signal to user equipments (UEs), wherein the information is determined to assign orthogonal sequences to the UEs within a UE group considering at least one or more of a number of orthogonal sequences, a number of the UEs within the UE group, amount of information to be transmitted, channel condition between the base station and each UE, and a number of sequences assigned to each UE of the UEs; and receiving the uplink reference signals from the UEs using the sequence identified by the information, is provided.

The number of sequences assigned to each UE may be determined based on a number of singular values greater than a threshold value, wherein the singular values are of a covariance matrix of a channel between the base station and each UE.

The above method may further comprises: receiving a request message requesting an allocation of the sequence to be used for the uplink reference signal from the UEs after a predetermined amount of time, if the number of sequences assigned to the UEs is less than 1.

The number of sequences assigned to each UE may be controlled by adjusting the threshold value.

Here, the threshold value may be independently determined by each UE. Or, the threshold value may be determined by considering a specific condition of each UE and a common condition of the UEs of a same cell.

In another aspect of the present invention, a user equipment (UE) operating in a wireless communication system employing a massive MIMO (Multiple Input Multiple Output) scheme, the UE comprising: a receiver configured to receive information on a sequence used for an uplink reference signal from a base station, wherein the information is determined to assign orthogonal sequences to UEs within a UE group considering at least one or more of a number of orthogonal sequences, a number of the UEs within the UE group, amount of information to be transmitted, channel condition between the base station and each UE, and a number of sequences assigned to each UE of the UEs; and a transmitter configured to transmit the uplink reference signal to the base station using the sequence identified by the second information; and a processor connected to the receiver and transmitter, is provided.

In another aspect of the present invention, a base station operating in a wireless communication system employing a massive MIMO (Multiple Input Multiple Output) scheme, the base station comprising: a transmitter configured to transmit transmitting information on a sequence used for an uplink reference signal to user equipments (UEs), wherein the information is determined to assign orthogonal sequences to the UEs within a UE group considering at least one or more of a number of orthogonal sequences, a number of the UEs within the UE group, amount of information to be transmitted, channel condition between the base station and each UE, and a number of sequences assigned to each UE of the UEs; and a receiver configured to receive the uplink reference signals from the UEs using the sequence identified by the information; and a processor connected to the transmitter and the receiver, is provided.

Advantageous Effects

According to embodiments of the present invention, the network and the user equipment can efficiently transmit and receive signals in a wireless communication system.

It is to be understood that both the foregoing general description and the following detailed description of the present invention are exemplary and explanatory and are intended to provide further explanation of the invention as claimed.

DESCRIPTION OF DRAWINGS

The accompanying drawings, which are included to provide a further understanding of the invention and are incorporated in and constitute a part of this application, illustrate embodiment(s) of the invention and together with the description serve to explain the principle of the invention.

FIG. 3 is a diagram showing a control plane and a user plane of a radio interface protocol between a UE and an E-UTRAN based on a 3rd generation partnership project (3GPP) radio access network standard.

FIG. 6 shows a case when the base station having 4 antennas transmits cell-specific reference signal for channel estimation.

BEST MODE

The configuration, operation and other features of the present invention will be understood by the embodiments of the present invention described with reference to the accompanying drawings. The following embodiments are examples of applying the technical features of the present invention to a 3rd generation partnership project (3GPP) system.

Although the embodiments of the present invention are described using a long term evolution (LTE) system and a LTE-advanced (LTE-A) system in the present specification, they are purely exemplary. Therefore, the embodiments of the present invention are applicable to any other communication system corresponding to the above definition. In addition, although the embodiments of the present invention are described based on a time division duplex (TDD) scheme in the present specification, the embodiments of the present invention may be easily modified and applied to a half-duplex FDD (H-FDD) scheme or a frequency division duplex (FDD) scheme.

Figure 1:
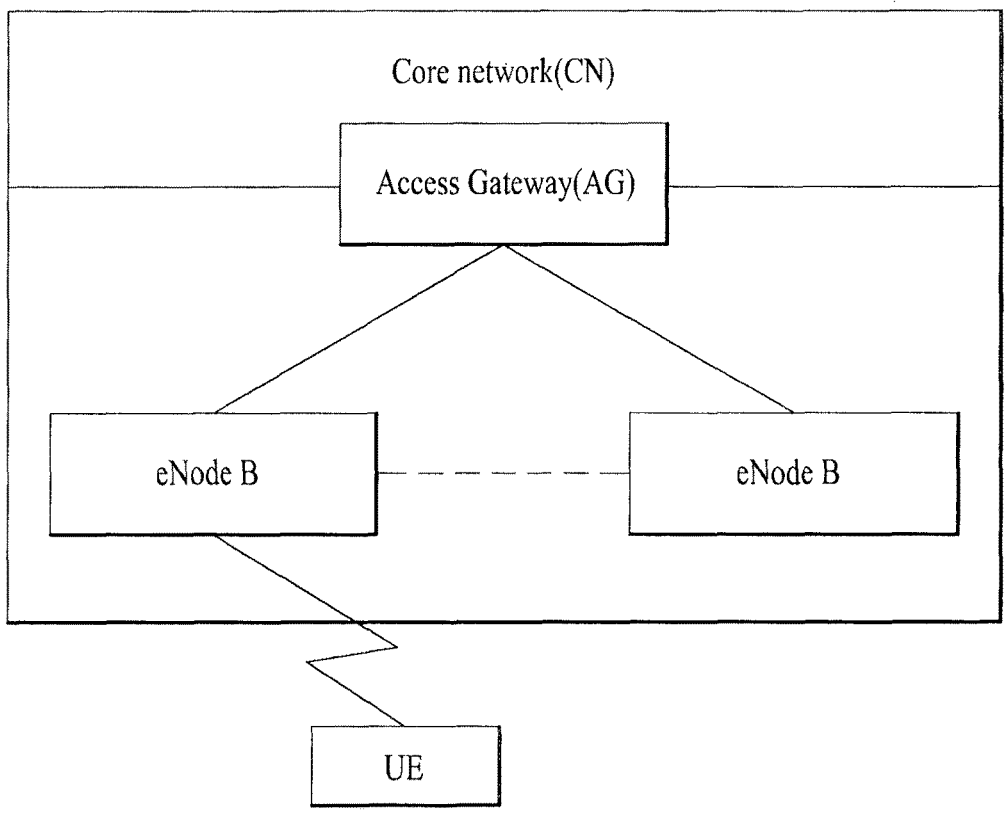
FIG. 1 is a diagram showing a network structure of an Evolved Universal Mobile Telecommunications System (E-UMTS) as an example of a wireless communication system.
Figure 2:
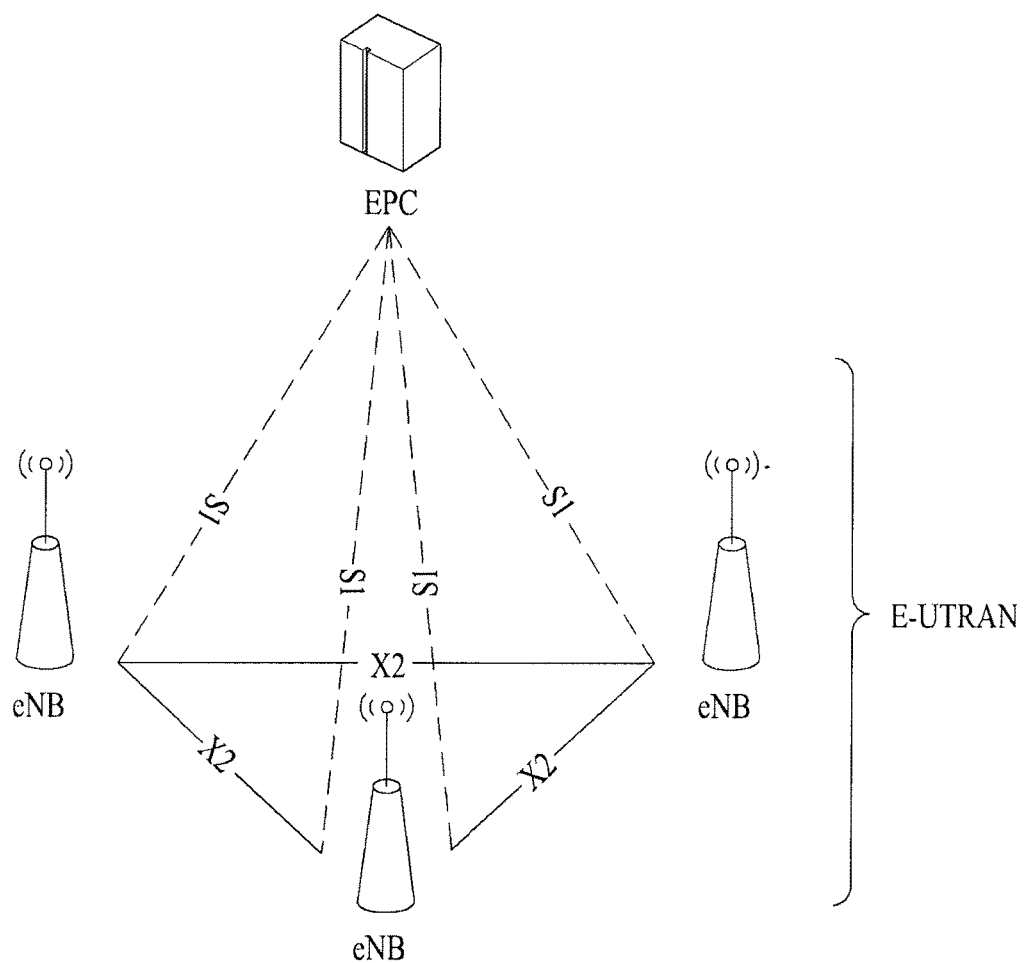
FIG. 2 is a diagram conceptually showing a network structure of an evolved universal terrestrial radio access network (E-UTRAN).

FIG. 2 is a diagram conceptually showing a network structure of an evolved universal terrestrial radio access network (E-UTRAN). An E-UTRAN system is an evolved form of a legacy UTRAN system. The E-UTRAN includes cells (eNB) which are connected to each other via an X2 interface. A cell is connected to a user equipment (UE) via a radio interface and to an evolved packet core (EPC) via an S1 interface.

The EPC includes a mobility management entity (MME), a serving-gateway (S-GW), and a packet data network-gateway (PDN-GW). The MME has information about connections and capabilities of UEs, mainly for use in managing the mobility of the UEs. The S-GW is a gateway having the E-UTRAN as an end point, and the PDN-GW is a gateway having a packet data network (PDN) as an end point.

FIG. 3 is a diagram showing a control plane and a user plane of a radio interface protocol between a UE and an E-UTRAN based on a 3GPP radio access network standard. The control plane refers to a path used for transmitting control messages used for managing a call between the UE and the E-UTRAN. The user plane refers to a path used for transmitting data generated in an application layer, e.g., voice data or Internet packet data.

A physical (PHY) layer of a first layer provides an information transfer service to a higher layer using a physical channel. The PHY layer is connected to a medium access control (MAC) layer located on the higher layer via a transport channel. Data is transported between the MAC layer and the PHY layer via the transport channel. Data is transported between a physical layer of a transmitting side and a physical layer of a receiving side via physical channels. The physical channels use time and frequency as radio resources. In detail, the physical channel is modulated using an orthogonal frequency division multiple access (OFDMA) scheme in downlink and is modulated using a single carrier frequency division multiple access (SC-FDMA) scheme in uplink.

The MAC layer of a second layer provides a service to a radio link control (RLC) layer of a higher layer via a logical channel. The RLC layer of the second layer supports reliable data transmission. A function of the RLC layer may be implemented by a functional block of the MAC layer. A packet data convergence protocol (PDCP) layer of the second layer performs a header compression function to reduce unnecessary control information for efficient transmission of an Internet protocol (IP) packet such as an IP version 4 (IPv4) packet or an IP version 6 (IPv6) packet in a radio interface having a relatively small bandwidth.

A radio resource control (RRC) layer located at the bottom of a third layer is defined only in the control plane. The RRC layer controls logical channels, transport channels, and physical channels in relation to configuration, re-configuration, and release of radio bearers (RBs). An RB refers to a service that the second layer provides for data transmission between the UE and the E-UTRAN. To this end, the RRC layer of the UE and the RRC layer of the E-UTRAN exchange RRC messages with each other.

One cell of the eNB is set to operate in one of bandwidths such as 1.25, 2.5, 5, 10, 15, and 20 MHz and provides a downlink or uplink transmission service to a plurality of UEs in the bandwidth. Different cells may be set to provide different bandwidths.

Downlink transport channels for transmission of data from the E-UTRAN to the UE include a broadcast channel (BCH) for transmission of system information, a paging channel (PCH) for transmission of paging messages, and a downlink shared channel (SCH) for transmission of user traffic or control messages. Traffic or control messages of a downlink multicast or broadcast service may be transmitted through the downlink SCH and may also be transmitted through a separate downlink multicast channel (MCH).

Uplink transport channels for transmission of data from the UE to the E-UTRAN include a random access channel (RACH) for transmission of initial control messages and an uplink SCH for transmission of user traffic or control messages. Logical channels that are defined above the transport channels and mapped to the transport channels include a broadcast control channel (BCCH), a paging control channel (PCCH), a common control channel (CCCH), a multicast control channel (MCCH), and a multicast traffic channel (MTCH).

Figure 4:
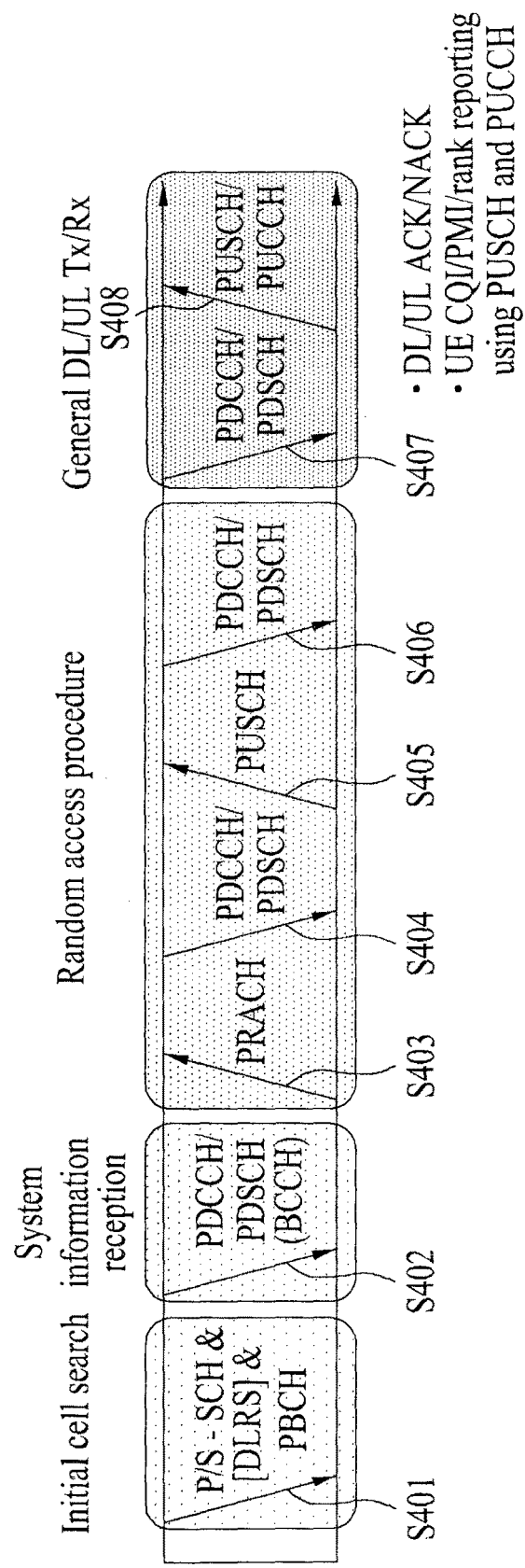
FIG. 4 is a diagram showing physical channels used in a 3GPP system and a general signal transmission method using the same.

FIG. 4 is a diagram showing physical channels used in a 3GPP system and a general signal transmission method using the same.

When a UE is powered on or enters a new cell, the UE performs an initial cell search operation such as synchronization with an eNB (S401). To this end, the UE may receive a primary synchronization channel (P-SCH) and a secondary synchronization channel (S-SCH) from the eNB to perform synchronization with the eNB and acquire information such as a cell ID. Then, the UE may receive a physical broadcast channel from the eNB to acquire broadcast information in the cell. During the initial cell search operation, the UE may receive a downlink reference signal (DL RS) so as to confirm a downlink channel state.

After the initial cell search operation, the UE may receive a physical downlink control channel (PDCCH) and a physical downlink control channel (PDSCH) based on information included in the PDCCH to acquire more detailed system information (S402).

When the UE initially accesses the eNB or has no radio resources for signal transmission, the UE may perform a random access procedure (RACH) with respect to the eNB (steps S403 to S406). To this end, the UE may transmit a specific sequence as a preamble through a physical random access channel (PRACH) (S403) and receive a response message to the preamble through the PDCCH and the PDSCH corresponding thereto (S404). In the case of contention-based RACH, the UE may further perform a contention resolution procedure.

After the above procedure, the UE may receive PDCCH/PDSCH from the eNB (S407) and may transmit a physical uplink shared channel (PUSCH)/physical uplink control channel (PUCCH) to the eNB (S408), which is a general uplink/downlink signal transmission procedure. Particularly, the UE receives downlink control information (DCI) through the PDCCH. Here, the DCI includes control information such as resource allocation information for the UE. Different DCI formats are defined according to different usages of DCI.

Control information transmitted from the UE to the eNB in uplink or transmitted from the eNB to the UE in downlink includes a downlink/uplink acknowledge/negative acknowledge (ACK/NACK) signal, a channel quality indicator (CQI), a precoding matrix index (PMI), a rank indicator (RI), and the like. In the case of the 3GPP LTE system, the UE may transmit the control information such as CQI/PMI/RI through the PUSCH and/or the PUCCH.

Figure 5:
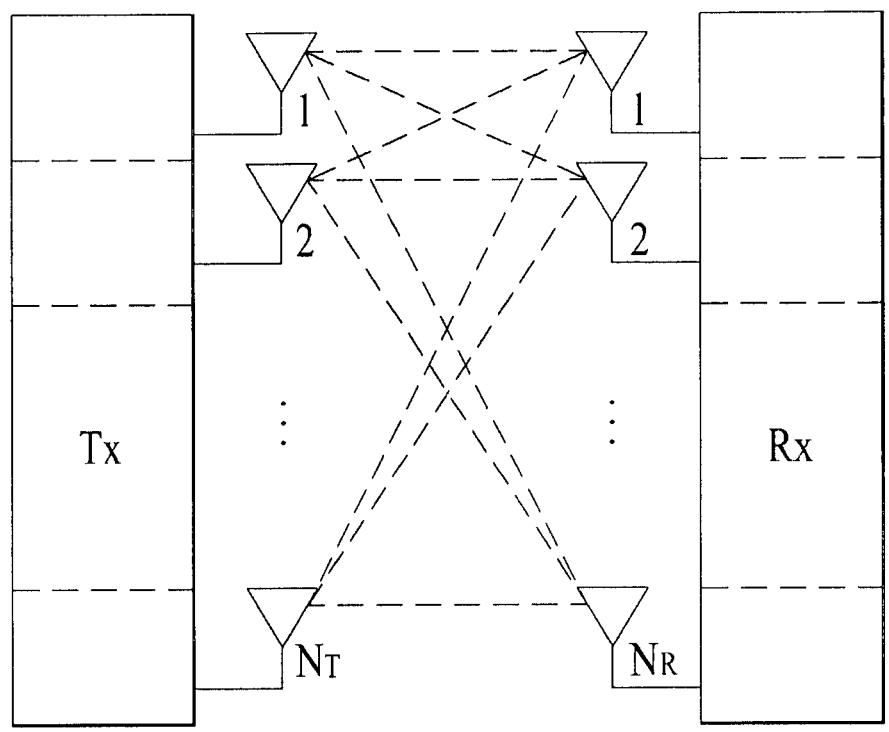
FIG. 5 is a diagram for a configuration of a general multi-antenna (MIMO) communication system.

FIG. 5 is a diagram for a configuration of a general multi-antenna (MIMO) communication system.

$N_T$ transmitting antennas are provided to a transmitting stage, while $N_R$ receiving antennas are provided to a receiving stage. In case that each of the transmitting and receiving stages uses a plurality of antennas, theoretical channel transmission capacity is increased more than that of a case that either the transmitting stage or the receiving stage uses a plurality of antennas. The increase of the channel transmission capacity is in proportion to the number of antennas.

Hence, a transmission rate is enhanced and frequency efficiency can be raised. Assuming that a maximum transmission rate in case of using a single antenna is set to $R_0$, the transmission rate in case of using multiple antennas may be theoretically raised by a result from multiplying the maximum transmission rate $R_0$ by a rate increasing rate $R_i$, as shown in equation 1. In this case, $R_i$ is a smaller one of $N_T$ and $N_R$.

$$R_i = \min(N_T, N_R) \quad \text{[Equation 1]}$$

For instance, in an MIMO communication system, which uses 4 transmitting antennas and 4 receiving antennas, it may be able to obtain a transmission rate 4 times higher than that of a single antenna system.

The above explained MIMO system assumes that the transmitter in a wireless communication system knows the channel. For some transmission schemes (e.g. STC, alamouti method), there is no need to know the channel, but it cannot be generalized. Thus, there is need for channel estimation for MIMO, so the receiver/transmitter may transmit reference signals (RSs) for this purpose.

For channel estimation without interference, the RSs of multiple transmitters should be orthogonal to each other. If there is a correlation between the RS from the first transmitter to the first receiver and the RS from the second transmitter to the second receiver, the channel estimation at the first receiver may reflect not only the channel from the first transmitter to the first receiver but also the channel from the second transmitter to the first receiver. It can be said that the channel from the first transmitter to the first receiver is contaminated by the channel from the second transmitter to the first receiver. And, this can be also said as 'pilot contamination'.

The above explained pilot contamination may limits the link performance due to the error caused by this contamination, so even when the transmitter raise the transmission power, the link performance cannot be improved above a certain limit. So, the reference signals transmitted at certain timing should be orthogonal to each other.

Based on this, the concept of massive MIMO system of the present application will be explained.

Recently, the massive MIMO scheme got lots of attention as a candidate constituent technology for 5G mobile communication system. This massive MIMO scheme can be employed to the system including a base station having multiple antennas and UEs having one antenna. Even though each UE has only one antenna, the entire system can be viewed as MIMO system when multiple UEs served by the base station having multiple antennas. If we assume that the number of UEs is K, the gradation of capacity in high SNR may be expressed as $\min(N_T, K)$.

The number of antennas for the base station can be unlimited. But, practically, we can suppose that the number of antennas of a base station exceed a certain threshold number, in order to distinguish the massive MIMO scheme from the conventional MIMO scheme. This threshold value can be 4 or 8, for example, but we suppose the case when the number of antenna for one base station is much more than this exemplary threshold number.

Theoretically, when the number of antennas for one base station goes to infinite, the optimal transmission algorism of the base station may be MRT (maximal ration transmission), and optimal reception algorithm may be MRC (maximal ration combining). These MRT and MRC are simple, but the performance of these schemes is limited when the conventional MIMO scheme is used, because these schemes do not consider the interference. However, when the number of antennas for one base station goes to infinite, the above drawback is addressed. Also, if the number of antennas increases, the beam from one antenna can be sharp, so the signal from that antenna can be carried to the received without giving interference to other receivers.

On the other hand, in order to efficiently employ the above mentioned massive MIMO scheme, the preferred embodiment of the present application assumes the use of TDD (Time Division Duplex) instead of FDD (Frequency Division Duplex).

FIG. 6 shows a case when the base station having 4 antennas transmits cell-specific reference signal for channel estimation.

In order to perform downlink channel estimation in a wireless communication system employing FDD scheme, the base station shall transmits reference signals through each of the multiple antennas, and the UE shall feedback the channel status for each of the channels from each of antennas. FIG. 6 is for the case when the base station having 4 antennas transmits reference signals ($R_0$, $R_1$, $R_2$ and $R_3$) to each of the antenna ports 0, 1, 2 and 3. As can be seen from FIG. 6, the reference signals for different antennas take different resource elements in the time-frequency resource. Thus, when the number of antennas severely increases, the reference signal overhead shall severely increases.

Figure 7:
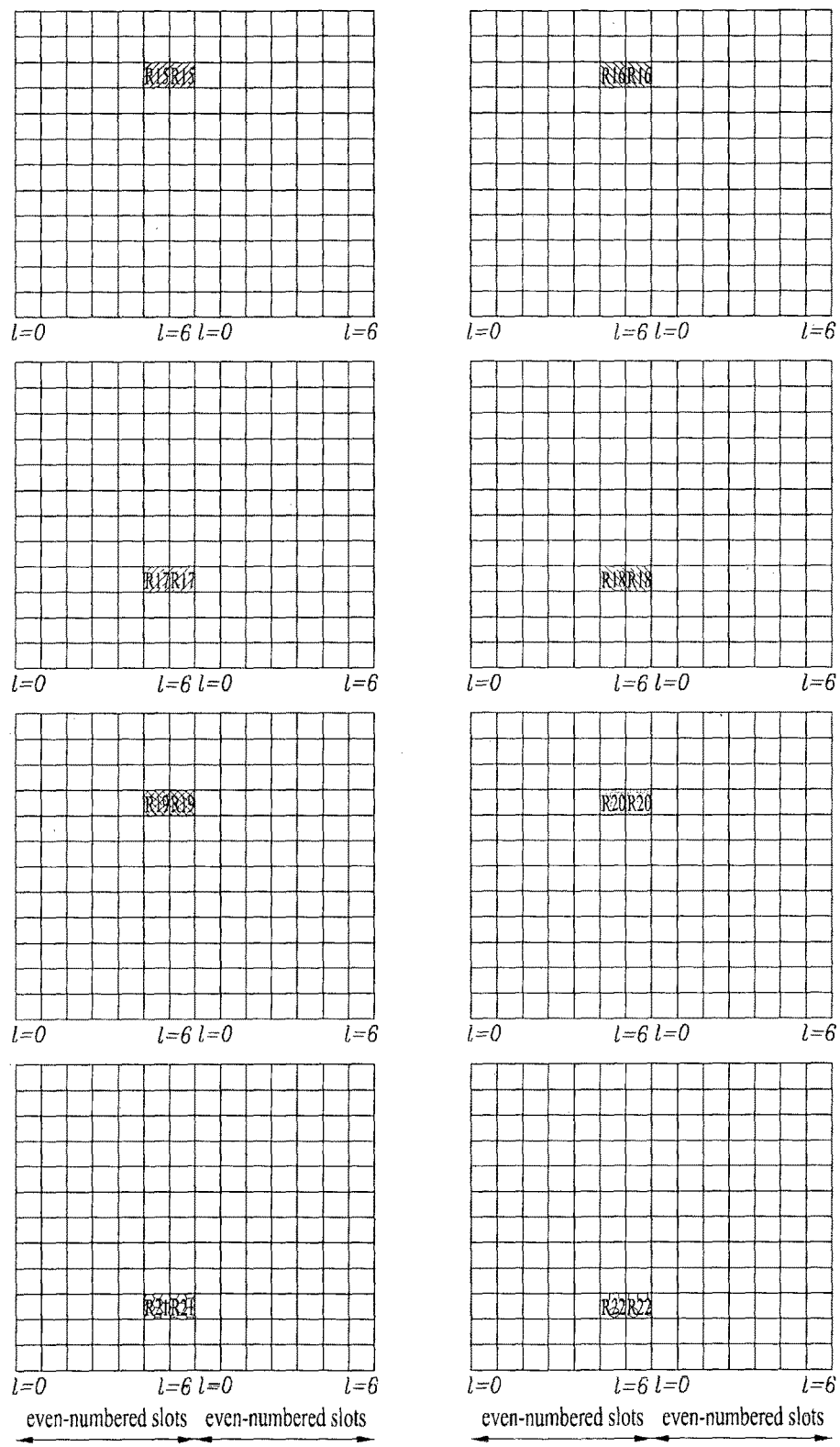
FIG. 7 shows a case when the base station having 8 antennas transmits CSI-RS for channel estimation.

FIG. 7 shows a case when the base station having 8 antennas transmits CSI-RS for channel estimation.

CSI-RS (Channel Status Information Reference Signal) is introduced to reduce the reference signal overhead. As can be seen from FIG. 7, the base station having 8 transmission antennas (antenna ports 15-22) may transmits the CSI-RSs via each of the antennas with reduced amount of resource when compared to the use of cell specific reference signal as shown by FIG. 6. Thus, one possible example of the present invention may use CSI-RS to estimate downlink channel, when the above explained massive MIMO is employed. However, in a preferred embodiment of the present application, the TDD scheme is employed and the uplink reference signal can be used to estimate downlink channel.

Figure 8:
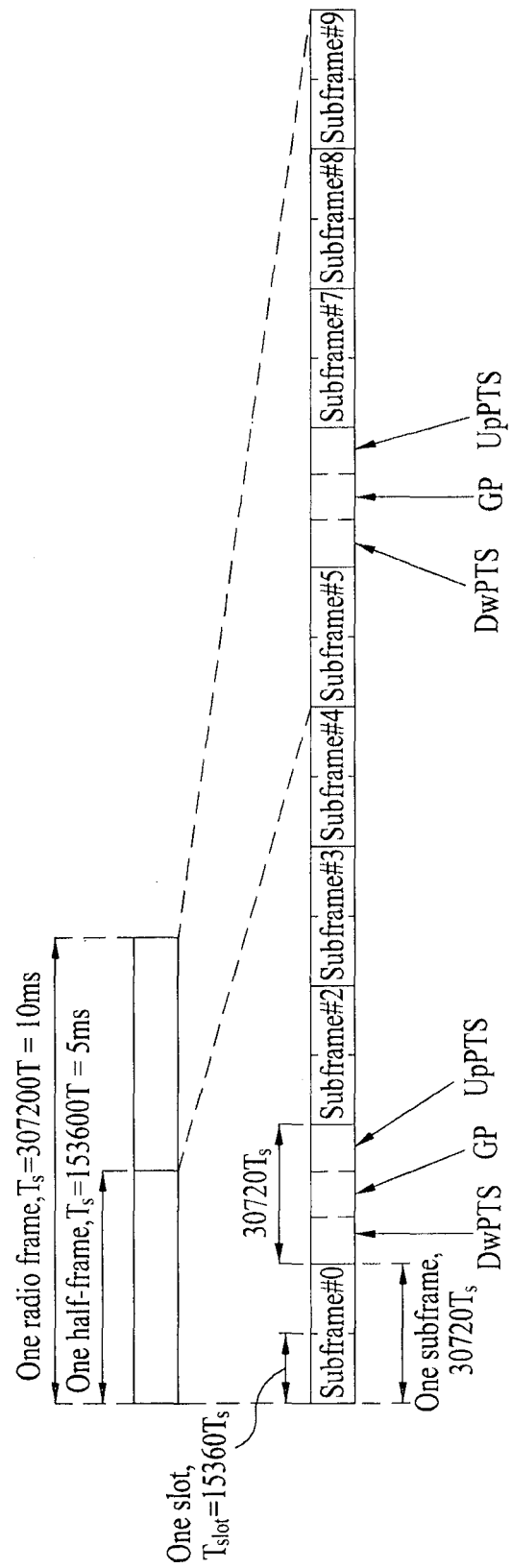
FIG. 8 shows a frame structure in a wireless communication system employing TDD scheme.

FIG. 8 shows a frame structure in a wireless communication system employing TDD scheme.

When FDD scheme is used, the downlink frequency band is different from the uplink frequency band. Thus, the estimation of the downlink channel is completely different from the estimation of the uplink channel. However, when the TDD scheme is used, the frequency band of the downlink channel is the same as that of uplink channel, thus we can use the uplink reference signal to estimate the downlink channel.

FIG. 8 is an example of the frame structure of one preferred embodiment of the present invention employing TDD scheme. Each radio frame of length $T_f = 307200 \cdot T_s = 10$ ms consists of two half-frames of length $153600 \cdot T_s = 5$ ms each. Each half-frame consists of five subframes of length $30720 \cdot T_s = 1$ ms. The supported uplink-downlink configurations are listed in [Table 1] where, for each subframe in a radio frame, "D" denotes the subframe is reserved for downlink transmissions, "U" denotes the subframe is reserved for uplink transmissions and "S" denotes a special subframe with the three fields DwPTS, GP and UpPTS. The length of DwPTS and UpPTS is given by [Table 2] subject to the total length of DwPTS, GP and UpPTS being equal to $30720 \cdot T_s = 1$ ms. Each subframe i is defined as two slots, 2i and 2i+1 of length $T_{slot} = 15360 \cdot T_s = 0.5$ ms in each subframe.

TABLE 1

| Uplink-downlink configuration | Downlink-to-Uplink Switch-point periodicity | Subframe number | | | | | | | | | |
|---|---|---|---|---|---|---|---|---|---|---|---|
| | | 0 | 1 | 2 | 3 | 4 | 5 | 6 | 7 | 8 | 9 |
| 0 | 5 ms | D | S | U | U | U | D | S | U | U | U |
| 1 | 5 ms | D | S | U | U | D | D | S | U | U | D |
| 2 | 5 ms | D | S | U | D | D | D | S | U | D | D |
| 3 | 10 ms | D | S | U | U | U | D | D | D | D | D |
| 4 | 10 ms | D | S | U | U | D | D | D | D | D | D |
| 5 | 10 ms | D | S | U | D | D | D | D | D | D | D |
| 6 | 5 ms | D | S | U | U | U | D | S | U | U | D |

TABLE 2

| Special subframe configuration | Normal cyclic prefix in downlink | | | Extended cyclic prefix in downlink | | |
|---|---|---|---|---|---|---|
| | | UpPTS | | | UpPTS | |
| | DwPTS | Normal cyclic prefix in uplink | Extended cyclic prefix in uplink | DwPTS | Normal cyclic prefix in uplink | Extended cyclic prefix in uplink |
| 0 | $6592 \cdot T_s$ | $2192 \cdot T_s$ | $2560 \cdot T_s$ | $7680 \cdot T_s$ | $2192 \cdot T_s$ | $2560 \cdot T_s$ |
| 1 | $19760 \cdot T_s$ | | | $20480 \cdot T_s$ | | |
| 2 | $21952 \cdot T_s$ | | | $23040 \cdot T_s$ | | |
| 3 | $24144 \cdot T_s$ | | | $25600 \cdot T_s$ | | |
| 4 | $26336 \cdot T_s$ | | | $7680 \cdot T_s$ | $4384 \cdot T_s$ | $5120 \cdot T_s$ |
| 5 | $6592 \cdot T_s$ | $4384 \cdot T_s$ | $5120 \cdot T_s$ | $20480 \cdot T_s$ | | |
| 6 | $19760 \cdot T_s$ | | | $23040 \cdot T_s$ | | |
| 7 | $21952 \cdot T_s$ | | | $12800 \cdot T_s$ | | |
| 8 | $24144 \cdot T_s$ | | | — | — | — |
| 9 | $13168 \cdot T_s$ | | | — | — | — |

Uplink-downlink configurations with both 5 ms and 10 ms downlink-to-uplink switch-point periodicity are supported.

In case of 5 ms downlink-to-uplink switch-point periodicity, the special subframe exists in both half-frames.

In case of 10 ms downlink-to-uplink switch-point periodicity, the special subframe exists in the first half-frame only.

Subframes 0 and 5 and DwPTS are always reserved for downlink transmission. UpPTS and the subframe immediately following the special subframe are always reserved for uplink transmission.

In case multiple cells are aggregated, the UE may assume that the guard period of the special subframe in the different cells have an overlap of at least $1456 \cdot T_s$.

In case multiple cells with different uplink-downlink configurations are aggregated and the UE is not capable of simultaneous reception and transmission in the aggregated cells, the following constraints apply:
 if the subframe in the primary cell is a downlink subframe, the UE shall not transmit any signal or channel on a secondary cell in the same subframe
 if the subframe in the primary cell is an uplink subframe, the UE is not expected to receive any downlink transmissions on a secondary cell in the same subframe
 if the subframe in the primary cell is a special subframe and the same subframe in a secondary cell is a downlink subframe, the UE is not expected to receive PDSCH/EPDCCH/PMCH/PRS transmissions in the secondary cell in the same subframe, and the UE is not expected to receive any other signals on the secondary cell in OFDM symbols that overlaps with the guard period or UpPTS in the primary cell.

By using the above explained frame structure for TDD scheme, the present embodiment may use the uplink reference signal to estimate the downlink channel. Further, the number of RSs does not have to increase when the number of antennas for one base station increase, and there is no need for the UEs to feedback the channel status information to the base station.

However, when the wireless communication system expends to multi-cell, the number of UEs shall increase, thus the number of orthogonal sequences for the uplink reference signals should increase to support it. But, there is a limit on the number of orthogonal sequences, thus when the number of orthogonal sequences is fewer than the number of UEs, there still may be the above explained pilot contamination problem.

To address this problem, one preferred embodiment of the present invention assumed UE grouping based reference signal transmission as explained below.

Figure 9:
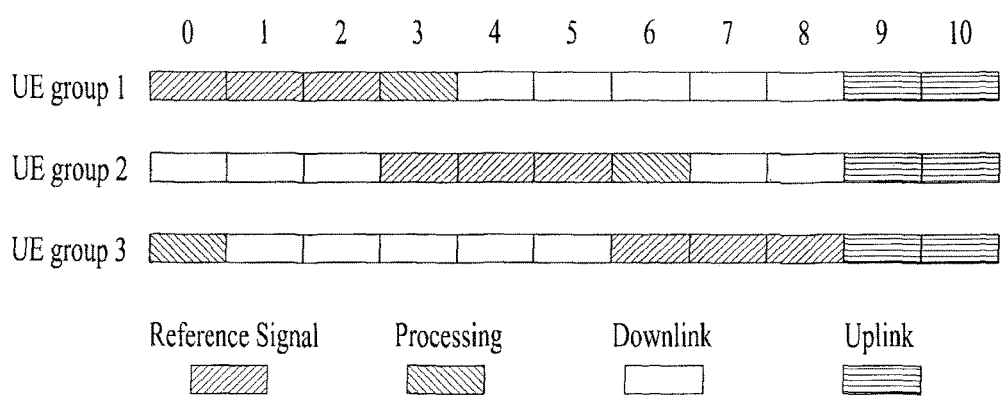
FIG. 9 shows UE grouping based reference signal transmission scheme according to one embodiment of the present invention.

FIG. 9 shows UE grouping based reference signal transmission scheme according to one embodiment of the present invention.

In this embodiment, the UEs in the wireless communication system may be grouped into multiple UE groups (e.g. UE group 1, UE group 2 and UE group 3 as shown in FIG. 9). UEs within the same UE group use orthogonal sequences for uplink reference signal orthogonal to each other. So, there is no pilot contamination problem for channel estimation.

Each UE group is synchronized with the base station with different timing. And, UEs of different UE groups may transmit uplink reference signals at different uplink transmission time units. For example, UE 1 of UE group 1 may transmits uplink sounding reference signal at subframes 0, 1 and 2 while UE 2 of UE group 2 receives downlink signal from the base station. The time units of FIG. 9 can be slot, subframe or equivalents. When the RS from UE 1 of UE group 1 is received by the base station, the base station may process it at subframe 4 while UE 2 of UE group 2 transmits uplink reference signals. When all the UE groups served by the base station (or base stations for Multi-BS operation) are synchronized with the base station(s), the UEs may transmits uplink data (e.g. from subframe 9 at FIG. 9).

The advantage of the above mentioned scheme will be explained.

Suppose there are two cells 'A' and 'B', and two UEs 'a' and 'b' within cells A and B, respectively. The channel $h_{mn}$ represents the channel between the $m^{th}$ base station and $n^{th}$ UE. The noise is not considered for convenience of explanation. In this case, when the base station A estimate the channel when the UEs a and b transmits SRS (sounding reference signal), the estimated channel can be expressed as $\hat{h}_{Aa} = \alpha_1 h_{Aa} + \alpha_2 h_{Ab} = \alpha_1 h_{Aa} + \alpha_2 h_{Ab}$. Here, $\alpha_1$ and $\alpha_2$ represent constant values. It can be said that the above estimated channel is contaminated by $\alpha_2 h_{Ab}$.

If the base station A receives data from UE a and UE b sending $\{d_a, d_b\}$, the result of MRC filter may be expressed as:

$$\frac{1}{N_t}\hat{h}^H_{Aa}(d_a h_{Aa} + d_b h_{Ab}) = \qquad \text{[Equation 2]}$$

$$\frac{1}{N_t}(\alpha_1 h^H_{Aa} + \alpha_2 h^H_{Ab})(d_a h_{Aa} + d_b h_{Ab}) =$$

$$\frac{\alpha_1 d_a}{N_t}\|h_{Aa}\|^2 + \frac{\alpha_2 d_b}{N_t}\|h_{Ab}\|^2 + \frac{\alpha_1 d_b}{N_t}h^H_{Aa}h_{Ab} +$$

$$\frac{\alpha_2 d_a}{N_t}h^H_{Ab}h_{Aa} \xrightarrow[N_t \to \infty]{} \frac{\alpha_1 d_a}{N_t}\|h_{Aa}\|^2 + \frac{\alpha_2 d_b}{N_t}\|h_{Ab}\|^2$$

In the above [equation 2], it can be recognized that the term $$\frac{\alpha_2 d_b}{N_t}\|h_{Ab}\|^2$$

does not arrive to 0 even when the number of antennas becomes infinite. So, there will be a performance degradation due to the pilot contamination.

However, when the above explained UE grouping based scheme is used, only one UE (e.g. UE a) transmit SRS while the other UE (e.g. UE b) does not transmit SRS. Suppose that the UE b receives data from the base station B while the UE a transmits SRS. In this case, the channel estimation at base station A can be expressed as:

$$\hat{h}_{Aa} = \alpha_1 h_{Aa} + \alpha_2 h_{AB} \qquad \text{[Equation 3]}$$

It should be noted that the term $h_{Ab}$ is replaced by $h_{AB}$, since the base station B transmits data when the UE a transmits reference signal. If the base station A receives data from UE a and UE b sending $\{d_a, d_b\}$, the result of MRC filter may be expressed as:

$$\frac{1}{N_t}\hat{h}^H_{Aa}(d_a h_{Aa} + d_b h_{Ab}) = \qquad \text{[Equation 4]}$$

$$\frac{1}{N_t}(\alpha_1 h^H_{Aa} + \alpha_2 h^H_{AB})(d_a h_{Aa} + d_b h_{Ab}) =$$

$$\frac{\alpha_1 d_a}{N_t}\|h_{Aa}\|^2 + \frac{\alpha_2 d_a}{N_t}h^H_{AB}h_{Aa} + \frac{\alpha_1 d_b}{N_t}h^H_{Aa}h_{Ab} +$$

$$\frac{\alpha_2 d_b}{N_t}h^H_{AB}h_{Ab} \xrightarrow[N_t \to \infty]{} \frac{\alpha_1 d_a}{N_t}\|h_{Aa}\|^2$$

It should be noted that the interference become 0 when the number of antenna become infinite. So, by using the UE grouping based RS transmission scheme, the pilot contamination problem can be addressed while the number of orthogonal sequences is limited.

The above mentioned UE grouping based RS scheme can be more improved by the following scheme.

In one embodiment of the present invention, one UE group can be multiple cells, and the same frame structure can be used for the UE group. For example, the same frame structure as shown in FIG. 9 can be used for cells within the same UE group.

At reference signal subframe, the UEs within the same UE group may transmit SRS and the base station estimates the channel based on it. In this case, when the UEs within the same UE group use orthogonal sequences, the base station may distinguish the channels from each UE. But, when the UEs within the same UE group use sequences having correlation value greater than 0, there will be a pilot contamination problem as stated above.

This may be more significant when the number of UE increases. For example, suppose there are N orthogonal sequences and the UEs within the UE group include Nr reception antennas. If the number of sequences allocated to each UE is Nr, the UE group can support N/Nr UEs. In this case, each UE can acquire the channel information for each of reception antennas, thus each UE can receive Nr signals simultaneously.

On the other hand, if the number of sequences allocated to each UE is Nr/2, the UE group can support 2N/Nr UEs. That is, each UE can uses Nr/2 antennas simultaneously, thus the throughput of one UE is reduced as ½. But the system can support two times more number of UEs at the same time.

In actual circumstance, the channel condition of each UE is different from each other. For example, some UEs may require transmitting lots of data, so it needs more channel capacity. For example, when the SNR is high, the channel capacity corresponds to the number of signals independently transmitter, thus it corresponds to the number of sequences allocated to the UE. On the other hand, there may be some UEs having no need for high channel capacity. Thus, the preferred embodiment of the present invention propose allocating more orthogonal sequences to the UEs with the need for high channel capacity while allocating less orthogonal sequences to the UEs with no needs for such high channel capacity.

In another example of the present invention, it is proposed to allocate sequences considering the condition of a cell. When the size of a cell reduces, the difference on the amount of data traffic increases. That is, one cell within a UE group need high channel capacity while another cell within the UE group has few UEs within the cell. So, when the number of available orthogonal sequence is N, and when there are cell A and cell B within one UE group, the sequences can be differently allocated considering the condition of each cell.

Considering all of the above, the present invention proposes efficient method for allocating sequences to each UE and proposes various metrics and signaling for the same. In this embodiment, at least one or more of (a) the number of UEs transmitting the SRS at the same time, (b) the amount of information to be transmitted/received and (c) the channel condition between the base station and the UEs (e.g. covariance matrix of the channels) are considered for the allocation. So different number of sequences can be allocated to each UE and/or each cell within the UE group.

In one example, the base station informs the UEs of the pilot resource available for the SRS transmission. Thus pilot resource information can vary with time considering the number of UEs and the amount of resource for data transmission. So this information may be signaled dynamically or signaled semi-statically. The pilot resource information may include time, frequency, code and space resources. And, it may be signaled via cell-specific information, cell-specific channel or UE-specific channel.

This resource information can have format indicating the start index and end index. Or, it can have format representing index of the collection of resource.

Orthogonal sequence sets for each cell may be different. For example, when one UE group comprises two cells, the pilot resource for each cell can be represented as:

$$S_1 = \{s_{1_1}, s_{1_2}, \ldots, s_{1_{N_1}}\}, S_2 = \{s_{2_1}, s_{2_2}, \ldots, s_{2_{N_2}}\}$$

This can be generalized as representing pilot resource with index 'i' as $$S_i = \{s_{i_1}, s_{i_2}, \ldots, s_{i_{N_i}}\}$$

where $s_{i_j}$ represents $j^{th}$ sequence of $i^{th}$ cell. In this case, $N_1$, $N_2$ may be determined based on the required channel capacity of each cell. For example, when the channel capacity requirement of cell 1 is twice as that of cell 2, it can be set as $N_1 = 2N_2$.

If $s_{1_i} \neq s_{2_j}$, $\forall i, j$ and $s_{1_i}^\dagger s_{2_j} = 0$, $\forall i, j$ are met, the SRS transmitted by the UE of cell 1 does not cause interference to cell 2, and vice versa. On the other hand, when there are UEs assigned the same sequence, the number of sequences available increases, but there may be interference. But, this may be addressed by somewhat complex scheduling scheme in some cases.

The pilot resource information can be periodically or non-periodically changed. When the resource information changes non-periodically, the base station may inform the change only when there is a change. This change of resource can be UE-specific or cell-specific.

This updated information does not need to indicate all the resource, but it needs indicating only the change comparing to the previous resource. For example, when the resource of $k^{th}$ UE is $\{s_{1_1}, s_{1_2}, s_{1_3}, s_{1_4}\}$, the resource information may have a form of $\{1,2,3,4\}$. And, when the resource for the $k^{th}$ UE is changed as $\{s_{1_1}, s_{1_2}, s_{1_3}\}$, the signaling for informing this change can have a form of $(-1, \{4\})$. Here, '−1' represents the change of the number of sequence, and $\{4\}$ represents the sequence deleted from the available sequence. Or the signaling for informing the above change can have a form of $\{4\}$. In this case, the UE already have the sequence $\{4\}$ for transmitting SRS, thus the UE may interprets this as deletion of sequence $\{4\}$ from the sequences for transmitting SRS.

In one example, when the signaling is scheduled to be transmitted periodically, and when there is no change in the pilot resource, the signaling can be as $(0, \{0\})$ or $(\{0\})$ representing there is no change.

In another embodiment of the present invention proposes allocating sequence considering the covariance matrix of the channel between the base station and each UE.

Suppose the channel between the $k^{th}$ UE and the base station is represented as $H_{k,w}$, where w represents the time in which the channel was estimated. In this case, the size of $H_{k,w}$ is $N_B \times v_k$, where $N_B$ is the number of antennas of the base station, and $v_k$ is the number of sequences allocated to the $k^{th}$ UE or the number of antennas of the kth UE at w. Here, $v_k$ is equal to or less than the number of antennas of the $k^{th}$ UE.

The covariance matrix between the base station and the $k^{th}$ UE can be represented as:

$$C_k = \frac{1}{W} \sum_{w=0}^{W-1} \alpha_w H_{k,w}^\dagger H_{k,w} \qquad \text{[Equation 5]}$$

Here, $\alpha_w$ is determined by the base station, and W represents the size of the window. For example, when W=1, only the channel estimated right before w is considered for the above calculation.

Suppose the singular values of the $C_k$ are represented as:

$$\{\lambda_{1,k}, \lambda_{2,k}, \ldots, \lambda_{v_k,k}\}, \lambda_{1,k} \geq \lambda_{2,k} \ldots \geq \lambda_{v_k,k} \qquad \text{[Equation 6]}$$

In one embodiment of the present invention sets a threshold value of $\chi_k$ to determine the number of sequences allocated to the $k^{th}$ UE as followings.

<Scheme 1>
Find the greatest 'j' meeting the condition of $\lambda_{j,k} \geq \chi_k$. Allocating j sequences to $k^{th}$ UE.

<Scheme 2>
Find the greated 'j' meeting the condition of $$\frac{\lambda_{j,k}}{\lambda_{1,k}} \geq \chi_k.$$

Allocating j sequences to $k^{th}$ UE.

The above schemes can be used by using SVD (singular value decomposition). But, EVD (eigen value decomposition) can also be used and the weight values for each layer can be calculated. So, any method for calculating the weight for each layer can be used for this embodiment.

When a specific UE does not meet the above condition, the base station may not allocate any sequence to that UE. In this case, the specific UE may transmit request message for requesting sequence allocation after a predetermined amount of time. Or, the base station may allocates at least one sequence to each UE even though there is the specific UE not meeting the above condition.

The above mentioned threshold value can be determined by considering the number of orthogonal sequences, the number of antennas of each UE, etc. This threshold value can be used to determine the number of sequences allocated to each UE as stated above.

Suppose there are N orthogonal sequences for SRS transmission and n1 UEs. In this case, the following condition will be met.

$$N = \sum_{k=1}^{n_1} v_k \qquad \text{[Equation 7]}$$

When the number of UEs increase, the base station may raise the threshold value to reduce the number of sequences allocated to the previous UEs. On the other hand, when the number of UEs decreases, the base station may reduce the threshold value. This control of the threshold value can be done considering the amount of data to be transmitted.

In one embodiment of the present invention, the threshold value can be determined considering both the cell-specific condition and the UE-specific condition. When the threshold value determined considering the cell-specific condition is $\chi_{k,1}$ and the threshold value determined considering the UE-specific condition is $\chi_{k,2}$, the threshold value of the present embodiment can be represented as:

$$\chi_k = w_1 \chi_{k,1} + w_2 \chi_{k,2} \quad \text{[Equation 8]}$$

Here, weights $w_1$ and $w_2$ can be determined by the base station. In this case, $w_1 \chi_{k,1}$ may represent factors to consider the system condition, and $w_2 \chi_{k,2}$ may represent factors to consider the UE condition.

The [Equation 8] may represent any combinations stated above. That is, any factors of one embodiment can be combined with another embodiment with the [Equation 8].

In one embodiment, the base station may allocate more sequences to a specific UE for certain period of time and reduce it after that period of time. Of course, the number of sequences available is limited, thus in order to allocate more sequence to the specific UE, the base station shall reduce the number of sequences of another UE during that period of time.

This kind of signaling shall be transmitted through UE specific channel while the sequence allocation to each cell can be transmitted through broadcast channel.

In the above embodiments, the 'orthogonal sequence' can sometime include 'semi-orthogonal sequence'.

Figure 10:
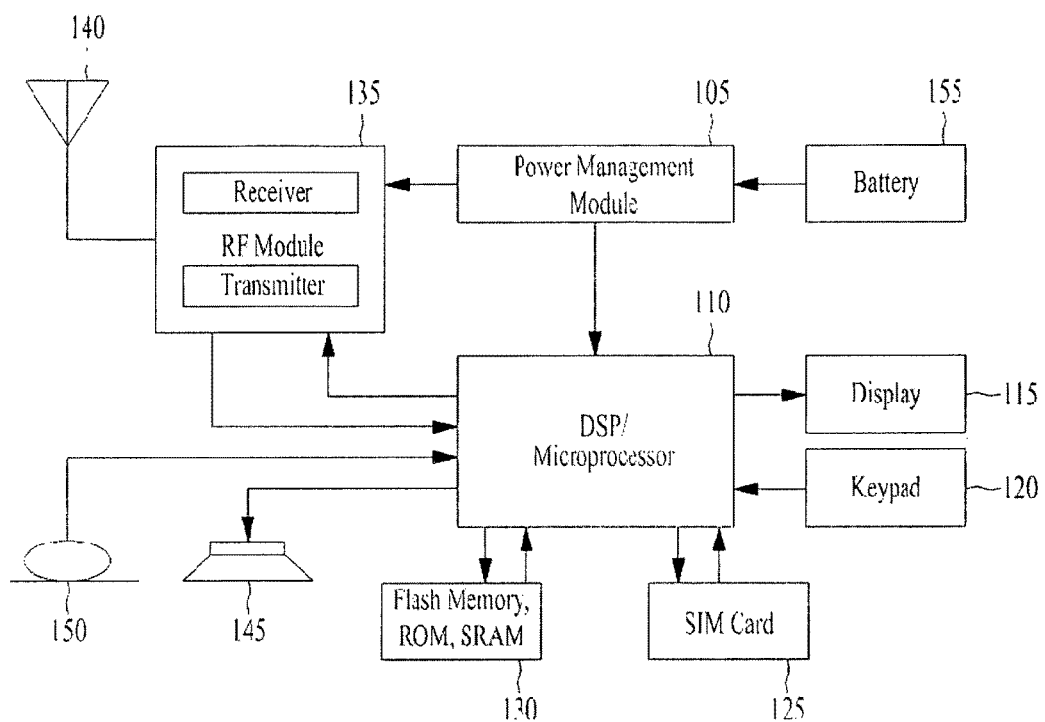
FIG. 10 is a block diagram of a communication apparatus according to an embodiment of the present invention.

FIG. 10 is a block diagram of a communication apparatus according to an embodiment of the present invention.

The apparatus shown in FIG. 10 can be a user equipment (UE) and/or eNB adapted to perform the above mechanism, but it can be any apparatus for performing the same operation.

As shown in FIG. 10, the apparatus may comprises a DSP/microprocessor (110) and RF module (transmiceiver; 135). The DSP/microprocessor (110) is electrically connected with the transciver (135) and controls it. The apparatus may further include power management module (105), battery (155), display (115), keypad (120), SIM card (125), memory device (130), speaker (145) and input device (150), based on its implementation and designer's choice.

Specifically, FIG. 10 may represent a UE comprising a receiver (135) configured to receive information on a sequence used for an uplink reference signal from a base station, a transmitter (135) configured to transmit the uplink reference signal to the base station using the sequence identified by the second information; and a processor (110) connected to the receiver (135) and transmitter (135). This information is determined to assign orthogonal sequences to UEs within a UE group considering at least one or more of a number of the UEs within the UE group, a number of orthogonal sequences, and a number of sequences assigned to each UE of the UEs.

Also, FIG. 10 may represent a base station operating in a wireless communication system employing a massive MIMO (Multiple Input Multiple Output) scheme. This base station comprises a transmitter (135) configured to transmit transmitting information on a sequence used for an uplink reference signal to user equipments (UEs), wherein the information is determined to assign orthogonal sequences to the UEs within a UE group considering at least one or more of a number of the UEs within the UE group, a number of orthogonal sequences, and a number of sequences assigned to each UE of the UEs; and a receiver (135) configured to receive the uplink reference signals from the UEs using the sequence identified by the information; and a processor (110) connected to the transmitter (135) and the receiver (135).

It will be apparent to those skilled in the art that various modifications and variations can be made in the present invention without departing from the spirit or scope of the invention. Thus, it is intended that the present invention cover the modifications and variations of this invention provided they come within the scope of the appended claims and their equivalents.

INDUSTRIAL APPLICABILITY

While the above-described method has been described centering on an example applied to the 3GPP LTE system, the present invention is applicable to a variety of wireless communication systems in addition to the 3GPP LTE system.

The invention claimed is:
1. A method for a user equipment (UE) to operate in a wireless communication system employing a massive Multiple Input Multiple Output (MIMO) scheme, the method comprising:
receiving information on a sequence to be used for an uplink reference signal from a base station, wherein the information is determined to assign orthogonal sequences to UEs within a UE group considering at least one or more of a number of orthogonal sequences, a number of the UEs within the UE group, an amount of information to be transmitted, a channel condition between the base station and each UE, and a number of sequences assigned to each UE of the UEs; and
transmitting the uplink reference signal to the base station using the sequence identified by the information,
wherein the number of sequences assigned to each UE is determined based on a number of singular values greater than a threshold value, and
wherein the singular values are of a covariance matrix of a channel between the base station and each UE.
2. The method of claim 1, further comprising:
transmitting a request message requesting an allocation of the sequence to be used for the uplink reference signal to the base station after a predetermined amount of time, if the number of sequences assigned to the UE is less than 1.
3. The method of claim 1, wherein the number of sequences assigned to each UE is equal to or greater than 1.
4. The method of claim 1, wherein the number of sequences assigned to each UE is controlled by adjusting the threshold value.
5. The method of claim 4, wherein the threshold value is independently determined by each UE.
6. The method of claim 4, wherein the threshold value is determined by considering a specific condition of each UE and a common condition of the UEs of a same cell.
7. A method for a base station to operate in a wireless communication system employing a massive Multiple Input Multiple Output (MIMO) scheme, the method comprising:
transmitting information on a sequence used for an uplink reference signal to user equipments (UEs), wherein the information is determined to assign orthogonal sequences to the UEs within a UE group considering at least one or more of a number of orthogonal sequences, a number of the UEs within the UE group, an amount of information to be transmitted, a channel condition between the base station and each UE, and a number of sequences assigned to each UE of the UEs; and
receiving the uplink reference signals from the UEs using the sequence identified by the information, wherein the number of sequences assigned to each UE is determined based on a number of singular values greater than a threshold value, and wherein the singular values are of a covariance matrix of a channel between the base station and each UE.

8. The method of claim 7, further comprising:

receiving a request message requesting an allocation of the sequence to be used for the uplink reference signal from the UEs after a predetermined amount of time, if the number of sequences assigned to the UEs is less than 1.

9. The method of claim 7, wherein the number of sequences assigned to each UE is controlled by adjusting the threshold value.

10. The method of claim 9, wherein the threshold value is independently determined by each UE.

11. The method of claim 9, wherein the threshold value is determined by considering a specific condition of each UE and a common condition of the UEs of a same cell.

12. A user equipment (UE) operating in a wireless communication system employing a massive Multiple Input Multiple Output (MIMO) scheme, the UE comprising:

a receiver configured to receive information on a sequence used for an uplink reference signal from a base station, wherein the information is determined to assign orthogonal sequences to UEs within a UE group considering at least one or more of a number of orthogonal sequences, a number of the UEs within the UE group, an amount of information to be transmitted, a channel condition between the base station and each UE, and a number of sequences assigned to each UE of the UEs;

a transmitter configured to transmit the uplink reference signal to the base station using the sequence identified by the information; and a processor connected to the receiver and transmitter, wherein the number of sequences assigned to each UE is determined based on a number of singular values greater than a threshold value, and wherein the singular values are of a covariance matrix of a channel between the base station and each UE.

13. A base station operating in a wireless communication system employing a massive Multiple Input Multiple Output (MIMO) scheme, the base station comprising:

a transmitter configured to transmit transmitting information on a sequence used for an uplink reference signal to user equipments (UEs), wherein the information is determined to assign orthogonal sequences to the UEs within a UE group considering at least one or more of a number of orthogonal sequences, a number of the UEs within the UE group, an amount of information to be transmitted, a channel condition between the base station and each UE, and a number of sequences assigned to each UE of the UEs;

a receiver configured to receive the uplink reference signals from the UEs using the sequence identified by the information; and a processor connected to the transmitter and the receiver, wherein the number of sequences assigned to each UE is determined based on a number of singular values greater than a threshold value, and wherein the singular values are of a covariance matrix of a channel between the base station and each UE.

* * * * *